3,236,834
METHOD FOR THE CATALYTIC REDUCTION OF β-CYANOETHYL CELLULOSE TO AN AMINOPROPYL CELLULOSE
Louis M. Soffer, Fullerton, Calif., assignor to the United States of America as represented by the Secretary of the Army
No Drawing. Filed Jan. 19, 1962, Ser. No. 167,450
2 Claims. (Cl. 260—232)
(Granted under Title 35, U.S. Code (1952), sec. 266)

The invention described herein may be manufactured and used by or for the Government of the United States of America for governmental purposes without the payment of any royalty thereon.

This invention relates to a process for the preparation of nitrogenous cellulose derivatives. More particularly this invention provides a method of preparing aminopropyl cellulose quickly without utilizing any type of amine material.

In the preparation of nitrogen containing cellulose derivatives, prior methods employed the combination of some cellulose, such as aldehyde acylated sugars, with primary amines of the benzene series. This combination was placed under reducing conditions thus forming the corresponding secondary amines. This reduction took place at only slightly elevated temperatures of between 20° and 50° C. and required a relatively long period of time, usually in excess of four hours excluding cooling time.

The present invention, for the production of an aminopropyl cellulose material by treating cyanoethyl cellulose with hydrogen or a hydrogen donor, provides a product which, by virtue of its nitrogen content, is in demand for various purposes such as a constituent of fast burning powders for hypervelocity guns or rocket propellants.

In preparing the cyanoethyl cellulose to be treated according to the present invention, a cellulose material such as, for example, chemical cotton, is treated with acrylonitrile. The treated cellulose (cyanoethyl cellulose) is then dried. The above explanation may be represented as follows:

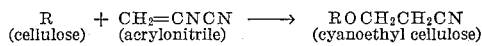

The following example illustrates how cyanoethyl cellulose may be treated to give aminopropyl cellulose. No limitations are to be implied therefrom.

*Example 1*

About 1.75 g. of dry cyanoethyl cellulose, having a nitrogen content of 4.7% by weight, was dissolved in 75 ml. of ethylene glycol, in a 100 ml. Pyrex glass lined shaker bomb. Also added to the shaker bomb was between 1 and 2 ml. of a catalyst consisting of Raney nickel suspended in alcohol. The shaker bomb was then sealed, evacuated and hydrogen was admitted therein. The bomb was then heated to a temperature of 150° C. After the desired temperature was reached, the pressure within the shaker bomb was raised to 2500 p.s.i. The temperature and pressure were then maintained at the desired points for 15 minutes. Cooling of the shaker bomb to room temperature which required about 2 hours, was then effected with the pressure remaining constant at 2500 p.s.i. After cooling, the pressure was released and the suspended aminoethyl cellulose derivative was removed. This derivative was washed with alcohol and ether before drying in a stream of air. A portion of the aminoethyl cellulose material was then ground and its infrared absorption spectra noted in an infrared spectrophotometer. The aminopropyl cellulose material showed no absorption band of the nitrile group at 4.5 microns, thus indicating complete reduction of the cyanoethyl cellulose had taken place.

The above reduction step may be represented as follows:

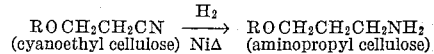

The following table indicates other examples in which various amounts of dry cyanoethyl cellulose, having a nitrogen content of 4.7, 6.3, and 8.8% by weight, were used and the pressure, temperature and time of heating were varied. The amount of catalyst added to each mixture remained the same, namely between 1 and 2 ml. Cooling to room temperature, which was effected with the pressure remaining elevated, required about 2 hours from 150° C., 1.75 hours from 125° C., and 1.5 hours from 100° C. The cellulose was considered reduced if there was a loss of the absorption band of the nitrile group at 4.5 microns when tested in an infrared spectrophotometer.

| Example | Cyanoethyl, Percent N | Cellulose, Wt. in g. | Pressure, p.s.i. | Temperature, °C. | Time, min. | Reduction |
|---|---|---|---|---|---|---|
| 2 | 8.8 | 1.75 | 2,500 | 100 | 1-2 | No. |
| 3 | 8.8 | 1.75 | 2,500 | 100 | 13 | No. |
| 4 | 8.8 | 1.75 | 2,500 | 150 | 30 | Yes. |
| 5 | 8.8 | 1.45 | 2,500 | 150 | 13 | Yes. |
| 6 | 8.8 | 1.75 | 1,600 | 150 | 10 | Yes. |
| 7 | 8.8 | 1.75 | 1,500 | 100 | 30 | No. |
| 8 | 8.8 | 1.75 | 2,500 | 125 | 10 | No. |
| 9 | 8.8 | 1.75 | 1,500 | 125 | 10 | No. |
| 10 | 6.3 | 1.75 | 2,500 | 150 | 15 | Yes. |
| 11 | 6.3 | 1.75 | 2,500 | 100 | 30 | No. |
| 12 | 6.3 | 1.75 | 1,500 | 150 | 20 | Yes. |
| 13 | 6.3 | 1.75 | 1,500 | 100 | 30 | No. |
| 14 | 4.7 | 0.8 | 2,500 | 100 | 30 | No. |
| 15 | 4.7 | 1.75 | 1,500 | 150 | 20 | Yes. |

From the above example and table it can readily be seen that any pressure between 1500 and 2500 pounds per square inch will give favorable results if the temperature factor is around 150° C. In fact, pressures as low as 150 p.s.i. have been found to be satisfactory. It can also be seen that the extent of cyanoethylation was not critical since derivatives of 4.7 to 8.8% nitrogen content reduced with equal ease. It was noted, however, that as the nitrogen content increased the reduced product became increasingly brittle and hard.

The above example and table indicate that the critical factor in the reduction of cyanoethyl cellulose to aminopropyl cellulose is the temperature. At 150° C. all of the cyanoethyl cellulose material was completely reduced (as determined by infrared absorption spectra) in the relative short time of from 10 to 20 minutes. However, at temperatures between 100 and 125° C. reduction was not attained in twice that time. In fact, judging from the absorption curves obtained from observation of the infrared absorption spectra, little, if any, reduction actually took place at temperatures below 125° C. At temperatures between 125 and 150 C., reduction is possible but requires a longer period of time.

Having thus described the invention, what is claimed is:
1. The process for producing aminopropyl cellulose which comprises mixing cyanoethyl cellulose with ethylene glycol and reducing said cyanoethyl cellulose with hydrogen in the presence of Raney nickel catalyst at a temperature in the range of about 125–150° C. and a pressure of at least 150 pounds per square inch.
2. The process for producing aminopropyl cellulose which comprises dissolving cyanoethyl cellulose having a nitrogen content between 4.7 and 8.8% by weight in ethylene glycol, adding a Raney nickel catalyst thereto and introducing hydrogen gas to said solution at a temperature of about 150° C. and a pressure of between about 1500 and 2500 pounds per square inch.

References Cited by the Examiner

UNITED STATES PATENTS

| | | | |
|---|---|---|---|
| 2,015,104 | 9/1935 | Dreyfuss | 260—232 |
| 2,186,101 | 1/1940 | Dreyfuss | 260—232 |

OTHER REFERENCES

Noller, Carl R.: "Chemistry of Organic Compounds," 2nd ed.; Saunders Co., pub. (1958), p. 232 relied on.

LEON J. BERCOVITZ, *Primary Examiner.*

ABRAHAM H. WINKELSTEIN, WILLIAM H. SHORT, *Examiners.*

R. S. AULL, E. C. EDWARDS, *Assistant Examiners.*